(12) United States Patent
Xiang

(10) Patent No.: US 12,242,002 B2
(45) Date of Patent: Mar. 4, 2025

(54) LASER RADAR

(71) Applicant: VELODYNE LIDAR USA, INC., San Jose, CA (US)

(72) Inventor: Shaoqing Xiang, Shanghai (CN)

(73) Assignee: Velodyne Lidar USA, Inc., San Jose, CA (US)

( * ) Notice: Subject to any disclaimer, the term of this patent is extended or adjusted under 35 U.S.C. 154(b) by 1101 days.

(21) Appl. No.: 17/255,948

(22) PCT Filed: Jun. 27, 2019

(86) PCT No.: PCT/CN2019/093266
§ 371 (c)(1),
(2) Date: Aug. 4, 2021

(87) PCT Pub. No.: WO2020/001535
PCT Pub. Date: Jan. 2, 2020

(65) Prior Publication Data
US 2021/0364608 A1     Nov. 25, 2021

(30) Foreign Application Priority Data

Jun. 27, 2018 (CN) .......................... 201810681182.1

(51) Int. Cl.
*G01S 7/481* (2006.01)
*G01S 7/483* (2006.01)

(52) U.S. Cl.
CPC ............ *G01S 7/4817* (2013.01); *G01S 7/483* (2013.01)

(58) Field of Classification Search
CPC ........ G01S 7/4817; G01S 7/483; G01S 7/484; G01S 7/4868; G01S 17/02

USPC ........................................................ 356/5.01
See application file for complete search history.

(56) References Cited

U.S. PATENT DOCUMENTS

| | | | |
|---|---|---|---|
| 7,570,346 B2 | 8/2009 | Yamaguchi et al. |
| 9,869,754 B1 | 1/2018 | Campbell et al. |
| 10,132,611 B2 | 11/2018 | Steffey et al. |
| 10,965,099 B2 | 3/2021 | Kitano |

(Continued)

FOREIGN PATENT DOCUMENTS

| | | |
|---|---|---|
| CN | 104620129 A | 5/2015 |
| CN | 107037444 A | 8/2017 |

(Continued)

OTHER PUBLICATIONS

EP19827251.0, "Intention to Grant", Oct. 18, 2023, 7 pages.

(Continued)

*Primary Examiner* — Daniel L Murphy
(74) *Attorney, Agent, or Firm* — Kilpatrick Townsend & Stockton LLP

(57) ABSTRACT

A laser radar, comprising: a laser (10): used for emitting a laser light beam; a probe (20): used for receiving the reflected laser light beam; and a set of transceiver structures (30): used for receiving the laser light beam emitted along a preset direction and conveying the laser light beam to the probe (20), the transceiver structures (30) being arranged coaxially with the laser (10), the transceiver structures (30) comprising a vertical field of view adjustment unit, and the vertical field of view adjustment unit making the laser light beam have a non-uniform distribution in the vertical field of view range and/or adjusting the vertical field of view range of the laser.

10 Claims, 6 Drawing Sheets

(56) References Cited

U.S. PATENT DOCUMENTS

| | | | |
|---|---|---|---|
| 12,105,198 B2 * | 10/2024 | Murayama | G01S 17/04 |
| 2014/0231647 A1 | 8/2014 | Chinn et al. | |
| 2015/0226853 A1 | 8/2015 | Seo et al. | |
| 2018/0131449 A1 | 5/2018 | Kare et al. | |
| 2018/0275249 A1 | 9/2018 | Campbell et al. | |

FOREIGN PATENT DOCUMENTS

| | | | |
|---|---|---|---|
| CN | 108061884 A | 5/2018 | |
| CN | 108089174 A | 5/2018 | |
| CN | 207457499 U | 6/2018 | |
| CN | 207457508 U | 6/2018 | |
| CN | 109116367 A | 1/2019 | |
| JP | 2003028960 A | 1/2003 | |
| JP | 2006258604 A | 9/2006 | |
| JP | 2008241535 A | 10/2008 | |
| JP | 2015200566 A | 11/2015 | |
| JP | 2015535337 A | 12/2015 | |
| JP | 2017090728 A | 5/2017 | |
| WO | 2017060965 A1 | 4/2017 | |
| WO | 2018031266 A1 | 2/2018 | |

OTHER PUBLICATIONS

JP2021-522126, "Office Action", May 23, 2023, 9 pages.
CN201980042619.X, "Office Action", Sep. 19, 2023, 25 pages.
JP2021-522126, "Office Action", Nov. 14, 2023, 6 pages.
International Search Report of PCT/CN2019/093266 dated Sep. 30, 2019, 3 pages.
Written Opinion for PCT/CN2019/093266 dated Sep. 23, 2019, 4 pages.
Abdullaev et al., "Improved Performance of Tunable Single Mode Laser Array Based on Non Uniformly Spaced Slots", Conference on Lasers and Electro-Optics (CLEO), 2015, 2 pages.
Chenhao et al., "A composite scanning method and experiment of laser radar", Infrared and Laser Engineering, 44.11 (2015), 6 pages.
CN201980042619.X, "Notice of Decision to Grant", Mar. 19, 2024, 8 pages.
CA3,108,100, "Office Action", Mar. 1, 2024, 6 pages.
U.S. Appl. No. 15/420,384, filed Jan. 31, 2017, Hall et al.
U.S. Appl. No. 15/700,836, filed Sep. 11, 2017, Hall et al.
U.S. Appl. No. 16/912,648, filed Jun. 25, 2020, Hall et al.
U.S. Appl. No. 16/909,846, filed Jun. 23, 2020, Hall et al.
U.S. Appl. No. 16/112,273, filed Aug. 24, 2018, Avlas et al.
U.S. Appl. No. 16/241,963, filed Jan. 7, 2019, Hall et al.

* cited by examiner

LASER RADAR

TECHNICAL FIELD

The present invention belongs to the field of radar and relates specifically to a laser radar.

BACKGROUND ART

By emitting and receiving a laser beam, measuring how long it takes the laser beam to return after encountering the target, calculating the relative distance between the target and the location of the laser radar (e.g., a vehicle, a low-flying helicopter, or a stationary detector), and collecting the 3D coordinates, reflectivity, and other information of the large number of closely spaced dots or points on the surface of the target, the laser radar can reconstruct a 3D model of the target.

Although measurements will be more accurate with more laser beams, the use of multiple laser detectors for multi-beam scanning often means that the laser radar is structurally complicated, difficult to assemble, and the stability of the system is poor. Meanwhile, because the multiple laser emitters of a multi-beam laser radar have essentially the same output pulse energy and frequency, the detection range is generally fixed, and the detection distance and angular resolution (vertical/horizontal) are also uniform, resulting in a waste of laser energy at the edge and insufficient angular resolution in the center, the energy of laser radar cannot be effectively utilized.

SUMMARY OF THE INVENTION

In order to solve the technical problems existing in the prior art, the present invention provides a laser radar, which comprises:

A laser: used for emitting a laser beam;
A detector: used for receiving the reflected laser beam;
A set of transceiver structures: used for receiving said laser beams emitted in the preset direction and transmitting said laser beams to the detector. Said transceiver structures are coaxial with said laser and include a vertical field of view adjustment unit; said vertical field of view adjustment unit distributes said laser beams non-uniformly in the vertical field of view and/or adjusts the vertical field of view of said laser beams.

Beneficial effects of the present invention: A single laser, a single detector, and a set of transceiver structures are arranged in a laser radar, and the transceiver structures are coaxial with the laser. The laser radar is structurally simpler and easier to assemble, making it easy to detect component failure and replace failed components quickly. When in use, it can be adjusted flexibly for the target through the laser and vertical field of view adjustment unit, so as to effectively avoid waste. The number and location of laser radars can also be arranged according to the purpose of detection.

DESCRIPTION OF DRAWINGS

The specific embodiments of the present invention are described in further detail below in combination with the drawings.

The following is additional information about the drawings:

10—Laser; 20—detector; 30—transceiver structures; 31—one-dimensional mirror galvanometer; mirror; 33—polarizing beam splitter; 34—quarter-wave plate; 40—target; 50—path of the outgoing beam; 60—path of the reflected beam; 70—collimating lens; 80—filter; 90—converging lens.

SPECIFIC EMBODIMENTS

In order to allow those skilled in the art to better understand the technical proposals of the embodiments disclosed in the specification, the technical proposals of the embodiments disclosed in the specification are clearly and completely described below in combination with the drawings in the embodiments. As should be clear, the embodiments described are only part of the embodiments disclosed in the specification, not all the embodiments. All other embodiments obtained by persons of ordinary skill in the art based on the embodiments disclosed in the specification without creative labor shall fall within the scope of protection of the specification.

Figure 1:
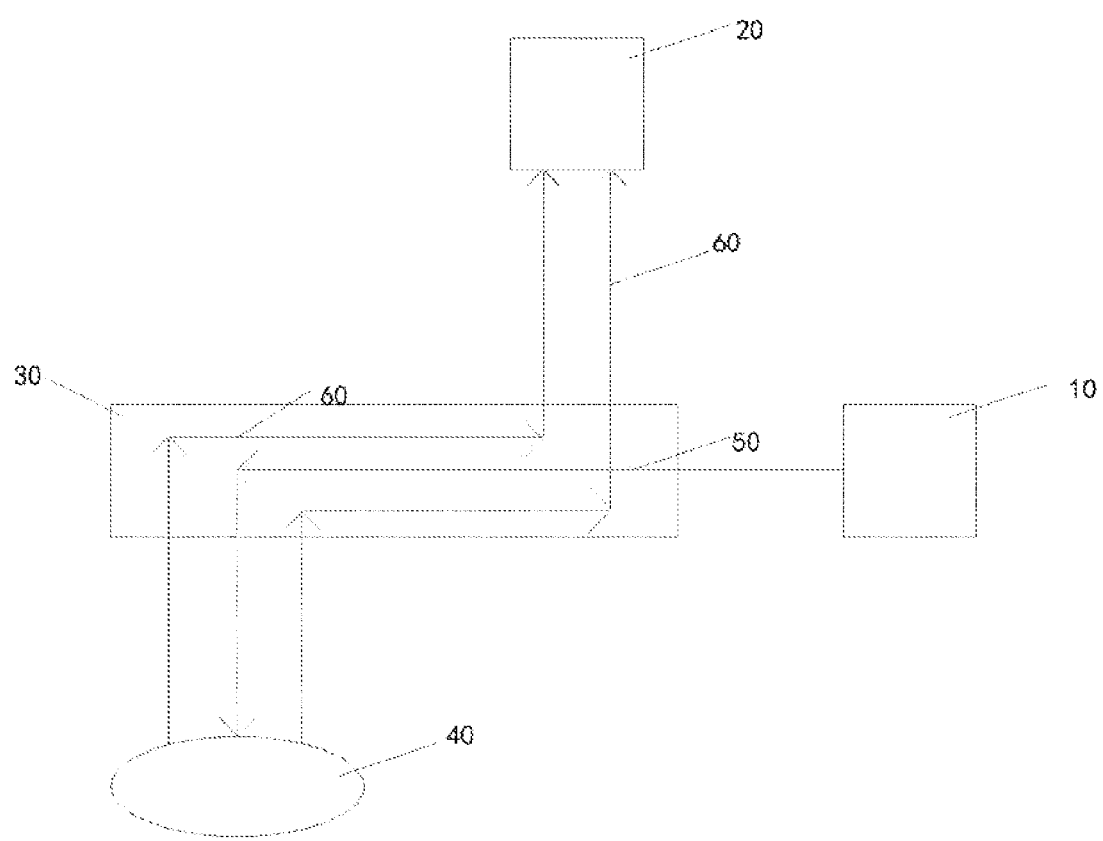
FIG. 1 is a schematic diagram of the laser radar according to some embodiments disclosed in the specification.

In one embodiment disclosed in the specification, as shown in FIG. 1, said laser radar comprises:

A laser 10: used for emitting a laser beam;
A detector 20: used for receiving said laser beam which is reflected back;
A set of transceiver structures 30: used for receiving said laser beams emitted in the preset direction and transmitting said laser beams to the detector. Said transceiver structures are coaxial with said laser and include a vertical field of view adjustment unit; said vertical field of view adjustment unit distributes said laser beams non-uniformly in the vertical field of view and/or adjusts the vertical field of view of said laser beams.

Figure 2:
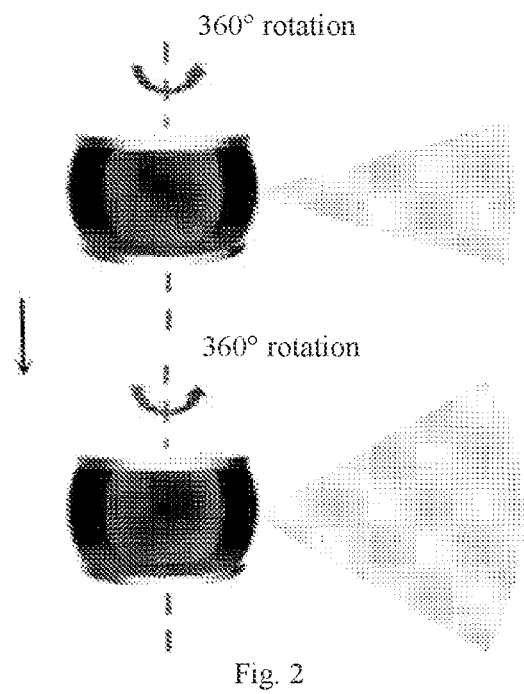
FIG. 2 is a schematic diagram of the relationship between the amplitude of oscillation of the vertical field of view adjustment unit provided by some embodiments disclosed in the specification and the vertical detection range.

As shown in FIG. 2, in an alternative embodiment, said vertical field of view adjustment unit deflects said laser beams by oscillating; adjusting the vertical field of view of said laser beams comprises increasing the amplitude of oscillation of said vertical field of view adjustment unit when the preset vertical field of view increases or decreasing the amplitude of oscillation of said vertical field of view adjustment unit when the preset vertical field of view decreases. Depending on the detection needs, the vertical field of view can be increased or decreased by increasing or decreasing the amplitude of oscillation of the vertical field of view adjustment unit.

Figure 3:
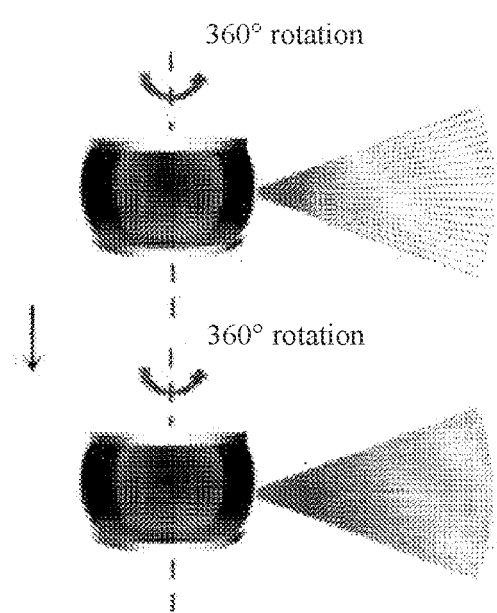
FIG. 3 is a schematic diagram of the relationship between the frequency of oscillation of the vertical field of view adjustment unit provided by some embodiments disclosed in the specification and the vertical detection resolution.

As shown in FIG. 3, in an alternative embodiment, the non-uniform distribution of said laser beams in the vertical field of view comprises said vertical field of view adjustment unit increasing the distribution density of said laser beams in a specific exiting direction. Said vertical field of view adjustment unit deflects said laser beams by oscillating.

Specifically, in a specific exiting direction, increasing the distribution density of said laser beams by said vertical field of view adjustment unit comprises increasing the frequency of oscillation of said vertical field of view adjustment unit as said laser beams move towards the center of the vertical field of view and decreasing the frequency of oscillation of said vertical field of view adjustment unit as said laser beams move away from the center of the vertical field of view. A dense laser beam distribution in the center of the vertical field of view ensures a higher vertical resolution; a sparse laser beam distribution in the upper and lower edges of the vertical field of view avoids waste caused by the laser beams illuminating the sky or the ground.

The spacing between laser beams moving towards the center of the vertical field of view can be uniform or non-uniform. The spacings between laser beams moving away from the center of the vertical field of view can be uniform or non-uniform.

Figure 6:
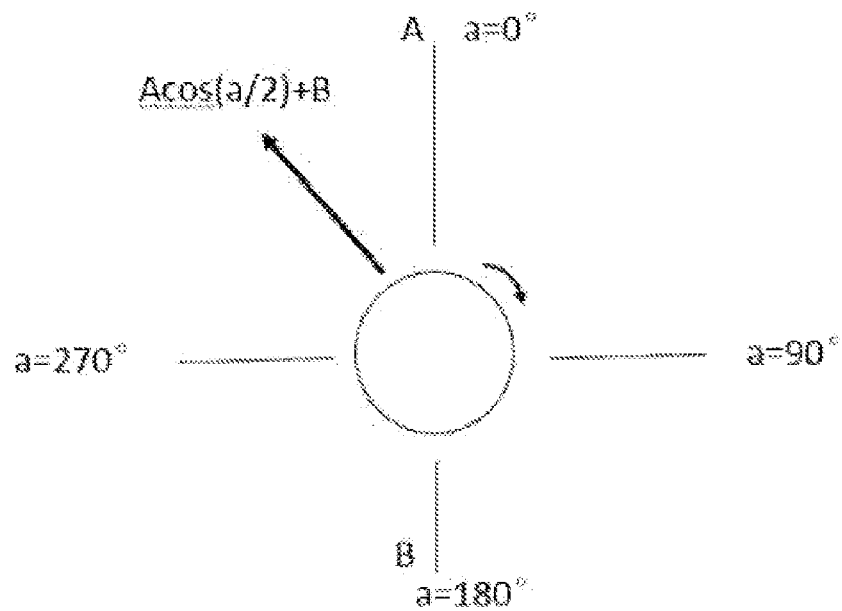
FIG. 6 is a schematic diagram of the laser radar scanning mode provided by some embodiments disclosed in the specification.

FIG. 6 is the top view of the scanning process of the laser radar. The polar coordinate system is established on this plane, and the scanning angle a is the polar angle. If the frequency of oscillation of the vertical field of view adjustment unit is S=Acos (a/2)+B, then the frequency of oscillation at the position a=0° is the largest, and the frequency of oscillation at the position a=180° is the smallest. It can be seen that in the scanning direction, the laser radar can have different distributions of frequencies of oscillation for the vertical field of view adjustment unit, which can be scanned not only according to the sine or cosine distribution, but also according to the following mode:

$$x(\theta) = a \sin \theta; \ y(\theta) = b \sin(n\theta + \varphi)$$
$$\text{Where } n \geq 1 \text{ and } 0 \leq \varphi \leq \frac{\pi}{2}$$

N is the parameter of the curve and is the frequency ratio of two sinusoidal vibrations.

If the ratio is a rational number, then $$n = \frac{q}{p}.$$

The parameter equation can ne written as: $x(\theta)=a \sin(p\theta)$; $y(\theta)=b \sin(q\theta+\varphi)$
$0 \leq \theta \leq 2\pi$, where $\theta$ is a scan variable, and the other parameters are constants.

As shown in FIGS. 2 and 3, the transceiver structures of the laser radar are located in the rotor, and the rotor, driven by the motor, rotates 360 degrees around the central axis to achieve 360-degree rotation in the horizontal direction and large field-of-view scanning in the vertical direction. As shown in FIG. 2, when the amplitude of oscillation of the vertical field of view adjustment unit is increased, the vertical field of view of the laser radar increases. As shown in FIG. 3, when the frequency of oscillation of the vertical field of view adjustment unit is increased, the vertical resolution of the laser radar increases.

In an alternative embodiment, said vertical field of view adjustment unit deflects said laser beams by oscillating, the oscillation of said vertical field of view adjustment unit is driven by a driving signal, said driving signal is encoded in the time domain, and the oscillation of said vertical field of view adjustment unit driven by said coded driving signal is temporally sequential.

The frequency and amplitude of the temporally sequential oscillation of said vertical field of view adjustment unit are non-uniform in the temporal sequence.

Specifically, the output frequency of the driving signal received by the vertical field of view adjustment unit may remain the same or vary. The driving signal has different codes, which may have different frequencies and/or intensities.

Figure 4:
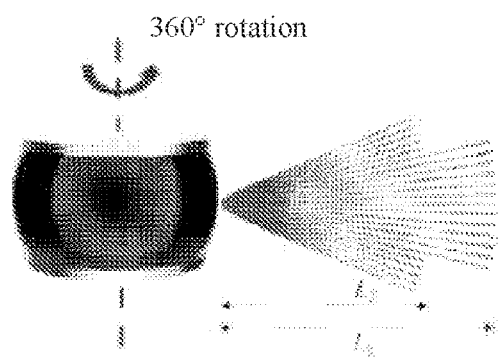
FIG. 4 is a schematic diagram of the relationship between the laser pulse output energy of the laser provided by some embodiments disclosed in the specification and the horizontal detection range.

As shown in FIG. 4, in an alternative embodiment, said vertical field of view adjustment unit deflects said laser beams by oscillating, and said laser adjusts the output energy of laser pulses according to the sensed oscillation of said vertical field of view adjustment unit, such that:

When said laser radar senses that the laser beam deflected by the oscillation of said vertical field of view adjustment unit is moving towards the center of the vertical field of view, the output energy of pulses emitted by said laser increases;

When the laser radar senses that the laser beam deflected by the oscillation of said vertical field of view adjustment unit is moving away from the center of the vertical field of view, the output energy of pulses emitted by said laser decreases.

Of course, said laser adjusts the output energy of laser pulses according to the sensed oscillation of said vertical field of view adjustment unit: the output energy of laser pulses varies according to the sensed direction of said laser beam deflected by the oscillation of said vertical field of view adjustment unit.

Figure 5:
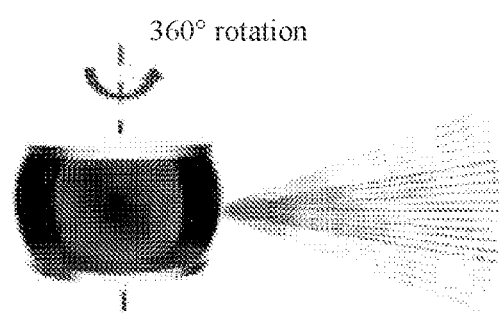
FIG. 5 is a schematic diagram of the relationship between the laser pulse output frequency of the laser provided by some embodiments disclosed in the specification and the horizontal detection resolution.

As shown in FIG. 5, in an alternative embodiment, said vertical field of view adjustment unit deflects said laser beams by oscillating, and said laser adjusts the output frequency of laser pulses according to the sensed oscillation of said vertical field of view adjustment unit, such that:

When said laser radar senses that the laser beam deflected by said oscillation of the vertical field of view adjustment unit is moving towards the center of the vertical field of view, the output frequency of pulses emitted by said laser increases;

When said laser senses that the laser beam deflected by the oscillation of said vertical field of view adjustment unit is moving away from the center of the vertical field of view, the output frequency of pulses emitted by said laser decreases.

Of course, said laser adjusts the output frequency of laser pulses according to the sensed oscillation of said vertical field of view adjustment unit: the output frequency of laser pulses varies according to the sensed direction of the laser beam deflected by the oscillation of said vertical field of view adjustment unit.

As shown in FIGS. 4 and 5, when the laser beam passing through said vertical field of view adjustment unit is moving towards the horizontal plane, the output energy and frequency of laser pulses are increased. The output energy and frequency of laser pulses are only increased when the laser beam is deflected towards the horizontal plane, so that farther objects on the horizontal plane (the focus area of the laser radar) can be detected at higher resolutions. Because most of the obstacles in the distance are found on the horizontal plane, when the laser beam is deflected towards the horizontal plane, increasing the output energy and frequency of laser pulses can improve the detection range and accuracy. When the laser beam is deflected away from the horizontal plane, the laser beam is wasted as it illuminates the sky or the ground in the distance. Therefore, since there is no need to measure so far and so accurately, the output energy and frequency of laser pulses can be reduced appropriately, so as to improve the utilization rate of the output energy and frequency of laser pulses. Of course, the specific adjustment range of the amplitude and frequency of oscillation of the vertical field of view adjustment unit and the output energy and frequency of laser pulses can be set flexibly according to the application requirements.

In addition, when said laser radar senses that the laser beam deflected by said vertical field of view adjustment unit is in a specific vertical exit direction, the output energy or frequency of laser pulses will be increased, and the output energy or frequency of pulses emitted by the laser varies according to the exit direction.

The laser, driven by a laser pulse excitation signal, emits a laser beam, the laser pulse excitation signal is encoded in the time domain, and the laser beam emitted by the laser driven by the encoded laser pulse excitation signal is temporally sequential. The output energy of laser pulses of the temporally sequential laser beam is non-uniform in the temporal sequence.

Of course, in an alternative embodiment, the output frequency of laser pulses and the frequency of oscillation of the vertical field of view adjustment unit can also be increased simultaneously in a certain direction. In this way, the horizontal resolution and vertical resolution in the scanning direction can be improved at the same time.

Figure 7:
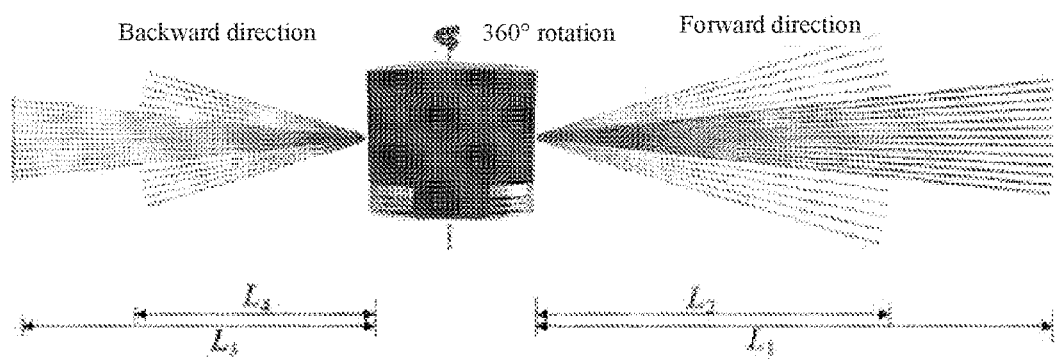
FIG. 7 is a schematic diagram of the laser radar according to some embodiments disclosed in the specification that emits non-uniform laser beams.

As shown in FIG. 7, in an alternative embodiment, the number of laser beams and the scanning frequency can be set for different directions. For example, in the forward direction, the output energy and frequency of laser pulses and the frequency of oscillation in the middle part of the field of view are higher, resulting in a higher scanning density and consequently enhanced detection in the front part of the field of view. Meanwhile, in the backward direction, the output energy and frequency of laser pulses and the frequency of oscillation in the middle part of the field of view are higher, resulting in a higher scanning density and consequently enhanced detection in the rear part of the field of view. Of course, FIG. 7 is only an example. In fact, the output energy and frequency of laser pulses and the frequency of oscillation in different positions in different directions can be adjusted.

Figure 8:
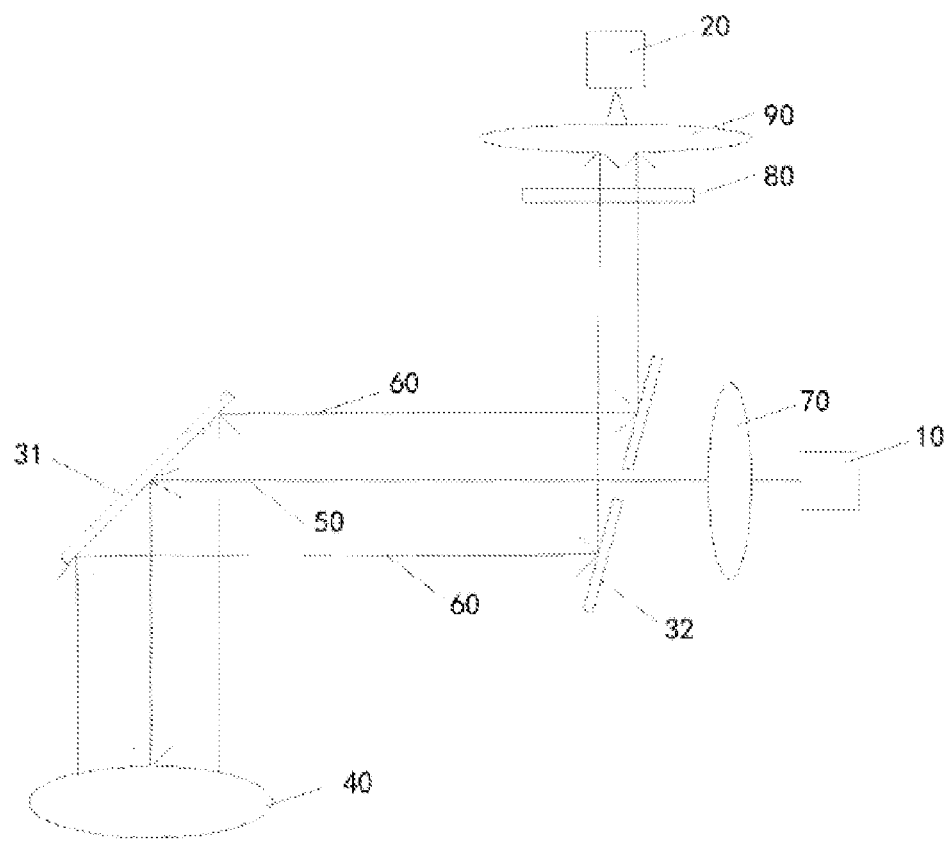
FIG. 8 is a schematic diagram of the path of the beam emitted by a laser radar according to some embodiments disclosed in the specification for detecting the target.

As shown in FIG. 8, in an alternative embodiment, said transceiver structures 30 also include a mirror 32; said mirror 32 includes the body of the mirror 32 and an aperture; said aperture is coaxial with said laser 10; the one-dimensional mirror galvanometer 31 can be used as said vertical field of view adjustment unit; said mirror 32 is placed at the near end of said transceiver structures 30 relative to said laser 10, and said one-dimensional mirror galvanometer 31 is placed at the far end of said transceiver structures 30 relative to said laser 10. For a thin laser beam, the aperture size can be set to 1-2 mm. Of course, the aperture size can be adjusted according to the size of the laser beam.

Specifically, as shown in FIG. 8 (path 50 of the outgoing beam; path 60 of the reflected beam said laser radar also includes a collimating lens (the laser beam emitted by said laser 10 passes through said collimating lens and then travels in the preset direction), a filter, and a converging lens. The laser beam (e.g., a thin laser beam) emitted by said laser 10 is collimated with said collimating lens, and then the laser beam directly passes through the aperture of said mirror 32 to said one-dimensional minor galvanometer 31; the amplitude and frequency of said one-dimensional mirror galvanometer 31 are adjustable (said one-dimensional mirror galvanometer 31 can perform high-frequency and large-angle scanning); the laser beam hits the target 40 after passing through said one-dimensional mirror galvanometer 31; the laser beam is diffuse reflected by the target 40 and returns, and is scanned and received by said one-dimensional mirror galvanometer 31; the laser beam is emitted to the body of said mirror 32; after being reflected by the body of said mirror 32, the laser beam successively passes through said filter 80 and said converging lens 90, and converges to said detector 20 through said converging lens 90.

In practical application, when said laser beam, passing through the one-dimensional mirror galvanometer 31, moves towards said horizontal plane, the output energy and frequency of pulses emitted by said laser 10 are increased. Through the laser control module, the output energy of pulses emitted by the laser 10 can be adjusted to distinguish targets at different ranges in different areas of the vertical field of view of the laser radar and in different directions; meanwhile, the output frequency of pulses emitted by the laser 10 can be adjusted to allow the laser radar to scan different areas at different horizontal resolutions. Said one-dimensional mirror galvanometer 31 includes a rotating shaft; said one-dimensional mirror galvanometer 31 oscillates perpendicularly to said horizontal plane around said rotating shaft, and the amplitude and frequency of oscillation of said one-dimensional mirror galvanometer 31 are adjustable. Through the mirror galvanometer control module, the amplitude of oscillation of the one-dimensional mirror galvanometer 31 can be adjusted to allow the laser radar to scan different vertical fields of view; meanwhile, the frequency of oscillation of the one-dimensional mirror galvanometer 31 can be adjusted to allow the laser radar to scan at different vertical resolutions.

Figure 9:
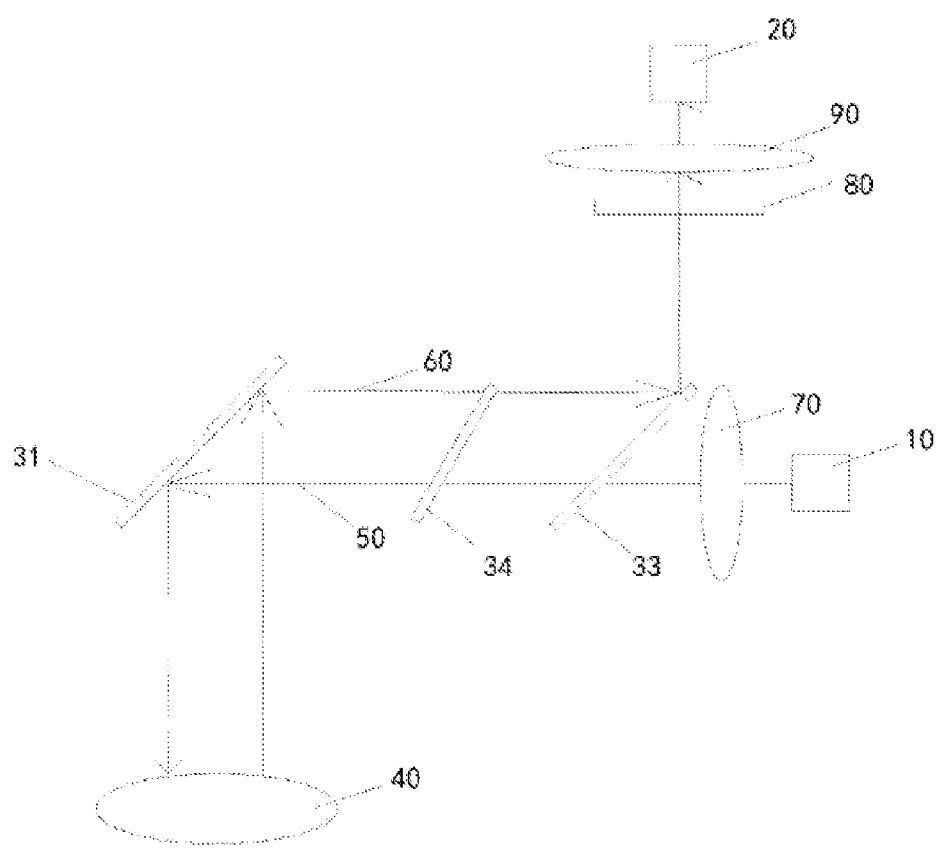
FIG. 9 is a schematic diagram of the path of the beam emitted by another type of laser radar according to some embodiments disclosed in the specification for detecting the target.

As shown in FIG. 9, in an alternative embodiment, said transceiver structures 30 also include a polarizing beam splitter 33 and a quarter-wave plate 34; the one-dimensional mirror galvanometer 31 can be used as said vertical field of view adjustment unit; said polarizing beam splitter 33 is placed at the near end of said transceiver structures 30 relative to said laser 10; said one-dimensional mirror galvanometer 31 is placed at the far end of said transceiver structures 30 relative to said laser 10; and said quarter-wave plate 34 is placed between said polarizing beam splitter 33 and said one-dimensional mirror galvanometer 31.

Specifically, as shown in FIG. 9 (path 50 of the outgoing beam; path 60 of the reflected beam), said laser radar also includes a collimating lens (the laser beam emitted by said laser 10 passes through said collimating lens 70 and then travels in the preset direction), the filter 80, and the converging lens 90. The laser beam emitted by said laser 10 is collimated with said collimating lens 70, and then the laser beam passes through said polarizing beam splitter 33 (for example, the p-polarized light passes through the polarizing beam splitter 33) and said quarter-wave plate 34 (linearly polarized light is circularly polarized after passing through the quarter-wave plate 34) to said one-dimensional minor galvanometer 31; the amplitude and frequency of said one-dimensional mirror galvanometer 31 are adjustable (said one-dimensional mirror galvanometer 31 can perform high-frequency and large-angle scanning); the laser beam hits the target 40 after passing through said one-dimensional mirror galvanometer 31; the laser beam is diffuse reflected by the target 40 and returns, and is scanned and received by said one-dimensional mirror galvanometer 31; the laser beam is emitted to said quarter-wave plate 34 (the circularly polarized light is linearly polarized after passing through said quarter-wave plate 34 again, and the direction of polarization is changed) and said polarizing beam splitter 33; after being reflected by said polarizing beam splitter 33 (for example, the p-polarized light that originally passed through said polarizing beam splitter 33 is changed to s-polarized light after passing through the quarter-wave plate twice, and the s-polarized light is reflected on account of being unable to pass through said polarizing beam splitter 33), the laser beam successively passes through said filter 80 and the converging lens 90 and converges to said detector 20 through said converging lens 90.

In practical application, when said laser beam, passing through the one-dimensional mirror galvanometer 31, moves towards said horizontal plane, the output energy and frequency of pulses emitted by said laser 10 are increased. Through the laser control module, the output energy of pulses emitted by the laser 10 can be adjusted to distinguish targets at different ranges in different areas of the vertical field of view of the laser radar and in different directions; meanwhile, the output frequency of pulses emitted by the laser 10 can be adjusted to allow the laser radar to scan different areas at different horizontal resolutions. Said one-dimensional mirror galvanometer 31 includes a rotating shaft; said one-dimensional mirror galvanometer 31 oscillates perpendicularly to said horizontal plane around said rotating shaft, and the amplitude and frequency of oscillation of said one-dimensional mirror galvanometer 31 are adjustable. Through the mirror galvanometer control module, the amplitude of oscillation of the one-dimensional mirror galvanometer 31 can be adjusted to allow the laser radar to scan different vertical fields of view; meanwhile, the frequency of oscillation of the one-dimensional mirror galvanometer 31 can be adjusted to allow the laser radar to scan at different vertical resolutions.

The laser radar is structurally simpler, uses only one laser 10 and one detector 20 and is easy to produce, install, and commission, greatly reducing the cost. Meanwhile, it is easy to detect component failure and replace failed components quickly. The coaxial transceiver structures 30 solve the receiving-sending mismatch problem and improve the stability of the system. The laser beam received by the transceiver structures 30 is a laser beam emitted in the preset direction. The laser beam here can be a laser beam emitted by the laser 10 in the preset direction or a laser beam emitted by the laser 10 that has been collimated between the laser 10 and the transceiver structures 30. The laser beam emitted in the preset direction ensures better coaxiality between the transceiver structures 30 and the laser 10. During use, the laser 10 can be adjusted flexibly for the target 40 so as to effectively avoid waste. The adjustability of the amplitude and frequency of oscillation of the vertical field of view adjustment unit and the output energy and frequency of pulses emitted by the laser 10 ensures flexibility in setting the vertical field of view, (vertical/horizontal) resolution, and detection range of the laser radar and improves the energy utilization rate and overall performance of the laser radar. The number and location of laser radars can also be arranged according to the purpose of detection.

In a possible embodiment, a one-dimensional mirror galvanometer, a two-dimensional mirror galvanometer, or the like may be used for the vertical field of view adjustment unit. Micro-electro-mechanical system (MEMS) can be used for the one-dimensional mirror galvanometer 31.

In a possible embodiment, the detector 20 can be an avalanche photodiode (APD), a PN/PIN photodetector, a photomultiplier tube, a CCD (charge coupled device) or a CMOS (complementary metal oxide semiconductor).

The above description of the disclosed embodiments allows those skilled in the art to implement or use the present invention. Modifications to these embodiments will be apparent to those skilled in the art, and the general principles defined herein can be implemented in other embodiments without departing from the spirit or scope of the present invention. Thus, the present invention is not intended to be limited to the embodiments shown herein but is to be accorded the widest scope consistent with the principles and novel features disclosed herein.

The invention claimed is:

1. A laser radar, characterized in that it comprises:
   A laser: used for emitting a laser beam;
   A detector: used for receiving the reflected laser beam;
   A set of transceiver structures: used for receiving said laser beams emitted in the preset direction and transmitting said laser beams to the detector; said transceiver structures are coaxial with said laser and include a vertical field of view adjustment unit; said vertical field of view adjustment unit distributes said laser beams non-uniformly in the vertical field of view and/or adjusts the vertical field of view of said laser beams.

2. A laser radar according to claim 1, characterized in that the non-uniform distribution of said laser beams in the vertical field of view comprises said vertical field of view adjustment unit increasing the distribution density of said laser beams in a specific exiting direction.

3. A laser radar according to claim 2, characterized in that said vertical field of view adjustment unit deflects said laser beams by oscillating;
   in a specific exit direction, the increase in the distribution density of said laser beams by said vertical field of view adjustment unit comprises when said laser beams move towards the center of the vertical field of view, the frequency of oscillation of said vertical field of view adjustment unit increases; when said laser beams move away from the center of the vertical field of view, the frequency of oscillation of said vertical field of view adjustment unit decreases.

4. A laser radar according to claim 1, characterized in that said vertical field of view adjustment unit deflects said laser beams by oscillating;
   the adjustment of the vertical field of view of said laser beams comprises the amplitude of oscillation of said vertical field of view adjustment unit increasing when the preset vertical field of view increases or the amplitude of oscillation of said vertical field of view adjustment unit decreasing when the preset vertical field of view decreases.

5. A laser radar according to claim 1, characterized in that said vertical field of view adjustment unit deflects said laser beams by oscillating, the oscillation of said vertical field of view adjustment unit is driven by a driving signal, said driving signal is encoded in the time domain, and the oscillation of said vertical field of view adjustment unit driven by said coded driving signal is temporally sequential.

6. A laser radar according to claim 5, characterized in that the frequency and amplitude of the temporally sequential oscillation of said vertical field of view adjustment unit are non-uniform in the temporal sequence.

7. A laser radar according to claim 1, characterized in that said vertical field of view adjustment unit deflects said laser beams by oscillating, and said laser adjusts the output energy of laser pulses according to the sensed oscillation of said vertical field of view adjustment unit:

when said laser senses that the laser beam deflected by the oscillation of said vertical field of view adjustment unit is moving towards the center of the vertical field of view, the output energy of pulses emitted by said laser increases;

when the laser senses that the laser beam deflected by the oscillation of said vertical field of view adjustment unit is moving away from the center of the vertical field of view, the output energy of pulses emitted by said laser decreases.

8. A laser radar according to claim 1, characterized in that said vertical field of view adjustment unit deflects said laser beams by oscillating, and said laser adjusts the output frequency of laser pulses according to the sensed oscillation of said vertical field of view adjustment unit:

when said laser senses that the laser beam deflected by said oscillation of the vertical field of view adjustment unit is moving towards the center of the vertical field of view, the output frequency of pulses emitted by said laser increases;

when said laser senses that the laser beam deflected by the oscillation of said vertical field of view adjustment unit is moving away from the center of the vertical field of view, the output frequency of pulses emitted by said laser decreases.

9. A laser radar according to any of claims 1 to 8, characterized in that said transceiver structures also include a mirror; said mirror includes the body of the mirror and an aperture; said aperture is coaxial with said laser; said mirror is placed at the near end of said transceiver structures relative to said laser; and said vertical field of view adjustment unit is placed at the far end of said transceiver structures relative to said laser;

alternatively, said transceiver structures also include a polarizing beam splitter and a quarter-wave plate; said polarizing beam splitter is placed at the near end of said transceiver structures relative to said laser; said vertical field of view adjustment unit is placed at the far end of said transceiver structures relative to said laser; and said quarter-wave plate is placed between said polarizing beam splitter and said vertical field of view adjustment unit.

10. A laser radar according to claim 1, characterized in that a one-dimensional mirror galvanometer or two-dimensional mirror galvanometer is used as said vertical field of view adjustment unit;

the detector uses an avalanche photodiode.

* * * * *